United States Patent Office 2,733,891
Patented Feb. 7, 1956

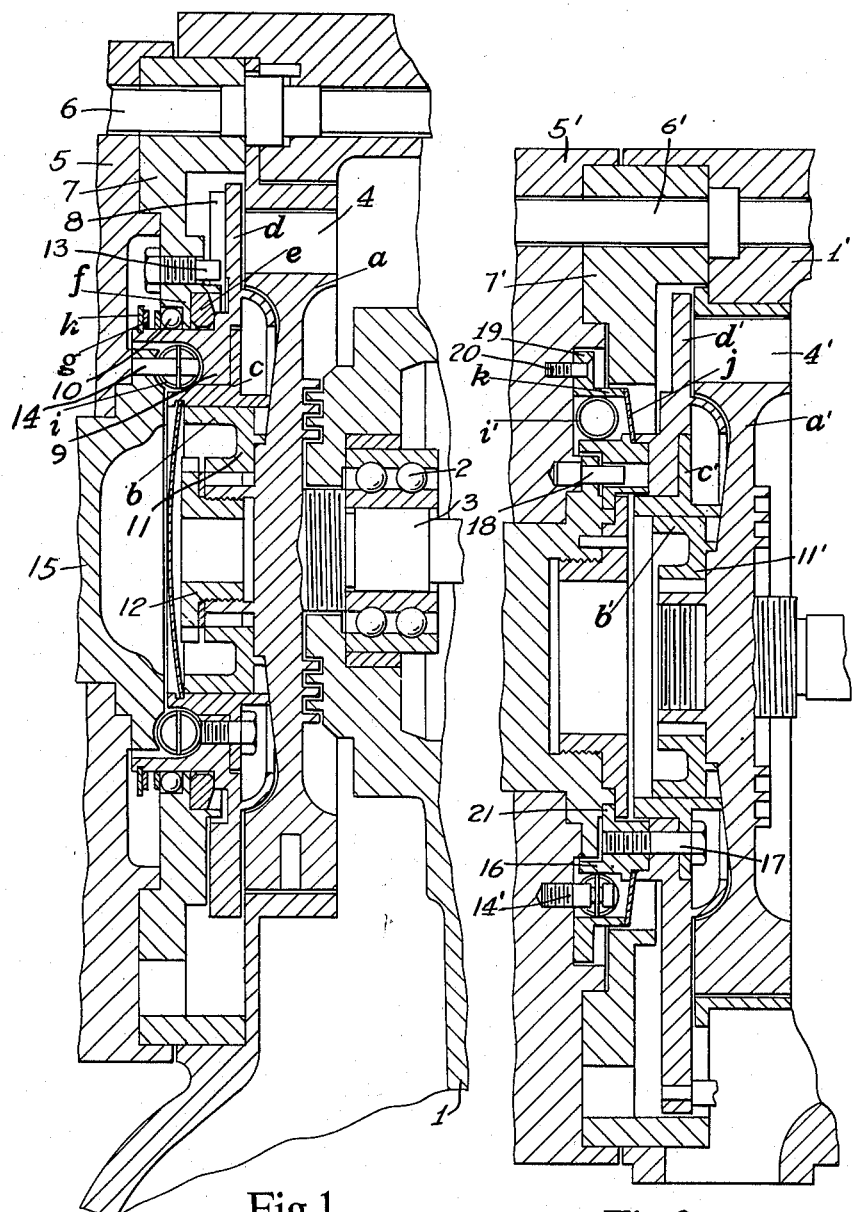

2,733,891

GAS TURBINES

Terence William Millns, Shepherds Bush, London, and Kenneth Theodore Guy, Eastcote, Pinner, England, assignors to Rotax Limited, London, England Application June 19, 1951, Serial No. 232,374

Claims priority, application Great Britain June 28, 1950

3 Claims. (Cl. 253—59)

In the specification of the United States Patent No. 2,569,898 we have described an invention relating to a gas turbine which has for its object to minimise risk of injury to the rotor in the event of its being accidentally rotated at an excessive speed. The said invention comprises a turbine having combined therewith protective means for deflecting the motive fluid from its normal path when the speed exceeds a predetermined amount, the said means being movable from one limit position to another in response to the action of centrifugal force.

Experience with turbines embodying the said invention has revealed the presence of a risk of interference with the desired action of the protective means by the fouling thereof by sooty deposits from the motive fluid, and the object of the present invention is to enable the said risk to be obviated or minimised in a simple and convenient manner.

The invention comprises the combination with the turbine, of sealing means arranged to isolate from the region of the incoming motive fluid, the parts of the protective means liable to be obstructed by sooty or other foreign matter.

Referring to Figure 1, the housing 1 of the gas turbine supports a bearing 2 for the shaft 3 of the turbine rotor $a$, the latter having blades 4 formed on or secured to its periphery. A housing part 5 secured to the housing 1 by bolts 6 carries a fixed nozzle plate 7 in which are formed nozzle passages leading to the rotor blading 4. Located between the fixed nozzle plate 7 and the rotor blading is a movable shutter $d$ having orifices therein which can be aligned with the nozzle passages in the fixed plate 7. A series of ribs 8 on the shutter $d$ are arranged adjacent to the orifices therein. The shutter $d$ has a hub 9 and is supported by bearings 10 so as to be capable of angular movement. A clutch disc 11 is secured to the rotor $a$ by a nut 12 and has an axially projecting and flexible peripheral flange $b$ which is split radially at a number of positions. A friction ring $c$ is secured to the shutter hub 9 and surrounds the flange $b$ so that when the letter expands under the action of centrifugal force upon the speed of the rotor exceeding a predetermined amount, the said flange engages the ring $c$ and imparts to the latter and to the shutter $d$ an angular movement which is restricted by a stop 13. This angular motion of the shutter $d$ is opposed by springs $i$ which are connected at one end to the shutter and at their other ends to pines 14 secured to the housing part 15. The arrangement is such that so long as the rotor is rotating at or below a predetermined speed, the shutter $d$ occupies a position in which the orifices therein are aligned with the nozzle passages in the fixed nozzle plate 7 and the turbine operates in the normal manner. But in the event that the aforesaid speed is exceeded, the effect of centrifugal force on the expansible flange $b$ causes it to engage the friction ring $c$ and thereby move the shutter $d$ angularly to an extent permitted by the stop 13 so that the ribs 8 in the shutter are moved to the opposite side of the nozzle passages and the motive fluid is thereby diverted from the rotor blading and the turbine is thereby put out of action. When the speed of the rotor has fallen sufficiently, the shutter is returned to its normal position by the springs $i$.

According to the form of the invention shown in Figure 1, there is mounted on the shutter $d$ at a position adjacent to the gas inlet (not shown), an annular sealing ring $e$ of hard carbon which at one side bears against the inner face of an adjacent stationary part $f$ of the nozzle plate. Also the shutter has a small amount of lateral freedom, and the sealing ring $e$ is maintained in close contact with the stationary part $f$ by a spring washer $g$ located between an abutment $h$ on the shutter and the outer face of the part $f$.

Further, the spring $i$ for returning the shutter to its normal position when the rotor has resumed its normal speed, is arranged adjacent to the flexible flange $b$ where it also is protected by the sealing ring $e$.

In the alternative arrangement shown in Figure 2, a turbine rotor $a^1$ having blading $4^1$ is rotatably mounted in a turbine housing $1^1$, as for example in bearings such as illustrated in the embodiment of Figure 1. A housing part $5^1$ secured to the housing $1^1$ by bolts $6^1$ carries a fixed nozzle plate $7^1$ in which are formed nozzle passages leading to the rotor blading $4^1$. A movable shutter $d^1$ is located between the fixed nozzle plate $7^1$ and the rotor blading and is provided with orifices which are normally aligned with the nozzle passages in the fixed plate $7^1$. The shutter $d^1$ has an inner friction ring $c^1$ and is secured between the latter and a ring 16 by bolts 17. A clutch disc $11^1$ is secured to the rotor $a^1$ and has an axially projecting and flexible peripheral flange $b^1$ which is split radially at a number of positions. When the speed of the rotor $a^1$ exceeds a predetermined speed, the flange $b^1$ expands and engages the friction ring $c^1$ so that the latter together with the shutter $d^1$ is given an angular movement which is restricted by a stop 18. This angular motion is opposed by springs $i^1$ which are connected at one end to the shutter and at their other ends to pins $14^1$ secured to the housing part $5^1$. As described in the previous example, motion of the shutter $d^1$ causes the motive fluid to be diverted from the rotor blading $4^1$, and when the speed of the rotor falls, the shutter is returned to its normal position by the springs $i^1$. The bearing surfaces of the shutter are shown at 21. These bearing surfaces and also the spring $i^1$ are protected from the motive fluid by a seal comprising an annulus $j$ of resilient metal, the inner periphery of which is clamped between the shutter $d^1$ and the ring 16 by the bolts 17. The outer periphery of the annulus $j$ is arranged to abut against the end of an axially projecting part $k$ of annular form having a flange 19 which is secured to the stationary housing part $5^1$ by bolts 20. The springs $i^1$ are located within the annular part $k$ and together with the bearing surfaces 21 are protected from the motive fluid by the annulus $j$.

By the provision of sealing means as above described effective isolation of the vulnerable parts from the motive fluid can be ensured in a simple manner.

Having thus described our invention what we claim as new and desire to secure by Letters Patent is:

1. A gas turbine comprising in combination a housing, a rotor mounted for rotation in the housing and provided with peripheral blading, a fixed nozzle member which is situated at one side of the rotor blading, and through which motive fluid can be supplied to the rotor blading, an annular shutter situated between the fixed nozzle member and the rotor blading and having spaced orifices therein, bearing means supporting the shutter so that the latter is capable of angular displacement between a normal position in which the motive fluid can flow therethrough to the rotor blading, and another position in which the motive fluid is deflected by the shutter away from the rotor blading, clutch means driven by the rotor and situated within the annular shutter, the clutch means having a radially expansible part capable of engaging the shutter under the action of centrifugal force, so that the shutter is angularly displaced by the said part of the clutch means into the position for deflecting the motive fluid away from the rotor blading when the speed of the rotor exceeds a predetermined limit, spring means arranged adjacent to the clutch means and interconnecting the housing and the shutter for urging the latter into its normal position, a stationary annular part situated at the side of the shutter remote from the rotor, and an annular sealing member supported by the said stationary annular part and the shutter between and in close contact therewith to isolate the region between the stationary nozzle member and the shutter from the shutter bearing means and the spring means.

2. A gas turbine according to claim 1, in which the annular sealing member consists of a hard carbon ring having opposite sides in contact with the said stationary annular part and shutter respectively and in which additional spring means are carried by the shutter between an abutment on the latter and the side of the stationary annular part remote from the carbon ring, the additional spring means serving to maintain contact of the carbon ring with the stationary part and shutter.

3. A gas turbine according to claim 1, in which the annular sealing member consists of a resilient metal annulus secured at one edge to the shutter and bearing against the said stationary annular part.

References Cited in the file of this patent

UNITED STATES PATENTS

| | | |
|---|---|---|
| 811,833 | Emmet | Feb. 6, 1906 |
| 2,531,896 | Telbizoff | Nov. 28, 1950 |
| 2,569,898 | Millns | Oct. 2, 1951 |